US006662015B2

(12) United States Patent
Furlong

(10) Patent No.: US 6,662,015 B2
(45) Date of Patent: Dec. 9, 2003

(54) APPARATUS AND METHOD FOR EXTRACTING PRESENCE, LOCATION AND AVAILABILITY DATA FROM A COMMUNICATION DEVICE DEPLOYED IN A NETWORK

(75) Inventor: Patrick Shane Furlong, Parker, CO (US)

(73) Assignee: Evolving Systems, Inc., Englewood, CO (US)

( * ) Notice: Subject to any disclaimer, the term of this patent is extended or adjusted under 35 U.S.C. 154(b) by 0 days.

(21) Appl. No.: 10/144,077

(22) Filed: May 13, 2002

(65) Prior Publication Data

US 2002/0187781 A1 Dec. 12, 2002

Related U.S. Application Data

(60) Provisional application No. 60/293,145, filed on May 23, 2001.

(51) Int. Cl.[7] .................................................. H04Q 7/20
(52) U.S. Cl. ............................... 455/456.5; 455/456.3; 455/414.2
(58) Field of Search ............................... 455/456, 445, 455/414, 433, 466, 414.1, 414.2, 432.2, 456.1, 456.3, 456.4, 560

(56) References Cited

U.S. PATENT DOCUMENTS

| | | | |
|---|---|---|---|
| 5,719,918 A | * | 2/1998 | Serbetciouglu et al. ....... 379/58 |
| 6,101,387 A | * | 8/2000 | Granberg et al. ........... 455/433 |
| 6,122,348 A | | 9/2000 | French-St. George et al. |
| 6,154,745 A | | 11/2000 | Kari et al. |
| 6,169,793 B1 | | 1/2001 | Godwin et al. |
| 6,198,933 B1 | | 3/2001 | Lundin |
| 6,366,780 B1 | | 4/2002 | Obhan |

OTHER PUBLICATIONS

PAM Forum (Nov. 27, 2000) *PAM Specification Document, Version 0.9* (on file with PAM Forum Executive Director).
PAM Forum (Sep. 11, 2001) *PAM Specification Document, Version 1.0* (on file with PAM Forum Executive Director).

* cited by examiner

*Primary Examiner*—Nay Maung
*Assistant Examiner*—Tanmay Lele
(74) *Attorney, Agent, or Firm*—Swanson & Bratschun, LLC

(57) ABSTRACT

A network adapter extracts presence, location and availability information relating to a communication device deployed in a communication network. The network adapter is configured to interface between the network and an application for providing information specified by the application. Preferably, the network adapter interfaces with the network at a single location to extract the desired information. In such an embodiment, the network adapter may reside in a link between network elements, such as a home location register ("HLR") and a short message service center ("SMS-C"). The network adapter may include a database of subscriber information codes used by the network to identify communication devices in use within the network. The network adapter also includes a processor programmed to query a network element, for example an HLR, to determine whether a communication device is present on the network and may also be programmed to monitor network communications for an indication of the presence of a device.

8 Claims, 3 Drawing Sheets

APPARATUS AND METHOD FOR EXTRACTING PRESENCE, LOCATION AND AVAILABILITY DATA FROM A COMMUNICATION DEVICE DEPLOYED IN A NETWORK

CROSS REFERENCE TO RELATED APPLICATION

This application claims priority from U.S. Provisional Application No. 60/293,145, filed May 23, 2001 and is related to co-pending and commonly-assigned U.S. Patent Application filed under Express Mail Label EV025903001US, entitled PRESENCE, LOCATION AND AVAILABILITY COMMUNICATION SYSTEM AND METHOD, filed on even date herewith, both of which are incorporated herein by reference.

TECHNICAL FIELD

The present invention relates to communications networks, and more particularly to an apparatus and method for extracting presence, location and availability information relating to a communication device deployed in a communication network.

BACKGROUND ART

Service providers have a great interest in promoting presence, location and availability ("PLA") services on their networks. Generally speaking, these PLA services use information about a subscriber's PLA to provide value added services to subscribers. For example, PLA information can be provided to third party applications providing customized traffic or weather reports. As another example, a subscriber can control access to PLA information as desired. As yet another example, PLA information can allow a subscriber to control availability to subscriber's communication devices by third parties based upon subscriber presence and location, as well as other factors such as time of day or date.

Critical to providing these PLA services is a presence, location and availability server ("PLAS") described in greater detail in the above referenced co-pending application. The PLAS described in such application provides application program interfaces ("API") enabling disparate devices and disparate networks to convey PLA information and enabling third party application providers to offer their applications to various service providers using the standard APIs. The PLAS also enables the subscriber to control PLA information from many devices across different networks from a single place. The PLAS further provides access to PLA information only in accordance with the subscriber's preferences, thereby ensuring subscriber privacy. In order to provide these many benefits, the PLAS needs some means of extracting presence and location information from a host service provider's network, other service providers networks and perhaps other providers of presence and location information.

In addition, other future communication service applications based upon information available on a network other than PLA information are foreseeable. Accordingly, a method and apparatus for efficiently extracting this information is also desirable.

The present invention is directed to solving one or more of the problems discussed above.

SUMMARY OF THE INVENTION

A network adapter is configured to interface between a network and an application for providing information specified by the application which is carried by the network to the application. Preferably, the network adapter interfaces with the network at a single location to extract all the desired information. In such an embodiment, the network adapter may reside in a link between network elements. In one embodiment, the application seeks information about the subscriber's presence on the network (the network may be a service provider's network or a network of a cooperating service provider). In another embodiment, the network may be a wireless network including one or more home location registers ("HLR") and a short message service center ("SMS-C"). In this embodiment, the network adapter resides in a link between the HLR and the SMS-C. In a further embodiment, the network adapter includes a database of subscriber information codes used by the network to identify communication devices in use within the network. The network adapter also includes a processor programmed to query a network element, for example an HLR, to determine whether a communication device is present on the network. The processor may also be programmed to monitor network communications for an indication of the presence of a device. For example, where the network adapter resides in a link between the HLR and the SMS-C, it monitors communications between the HLR and the SMS-C that indicate whether devices are present on the network. By comparing device identification data with that stored in its database, it can determine the presence status of the device and make that information available to an application. The application may be a PLAS or a PLA based service application interfacing with the PLAS.

The network adapter of the present invention extracts desired information from a communications network and provides it to an application. Where an application is a PLAS, the information concerns the presence, location and availability of a select communication device. The network adapter interfaces with the network at a single location to extract the information, minimizing required equipment and network taps, thereby decreasing costs and limiting potential failure points. The network adapter extracts the presence and location information without disrupting or materially delaying the flow of information over the network.

DETAILED DESCRIPTION OF THE PREFERRED EMBODIMENT

Figure 1:
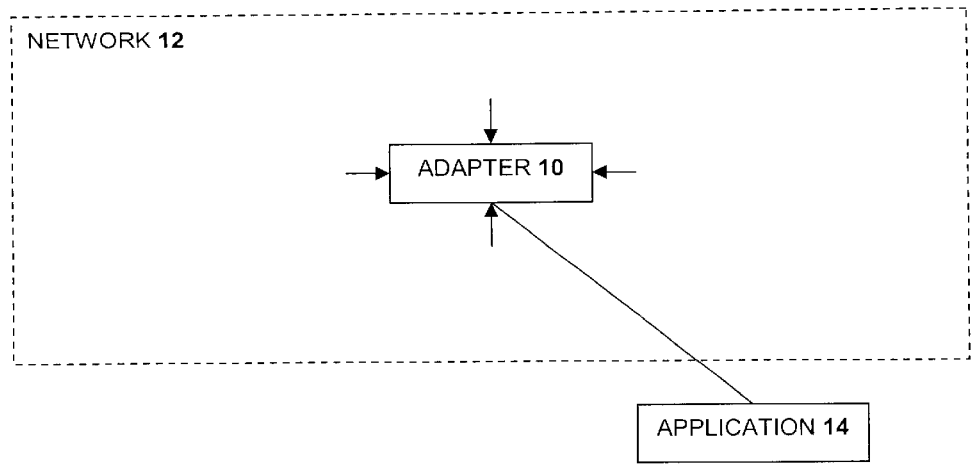
FIG. 1 is a schematic representation of a network adapter in a communication network in communication with an application outside the network.

Referring to FIG. 1, the present invention is a network adapter 10 residing in a network 12 that extracts select information from the network 12 and provides such information to an application 14 without disrupting the flow of information over the network 12. One particular embodiment of the invention is described in detail herein for extracting PLA information from a wireless network. The present invention is also applicable to other networks such as wire (landline) telephone networks, data networks and internet service providers (ISP), or any combination thereof, although the details of these implementations may vary.

Figure 2:
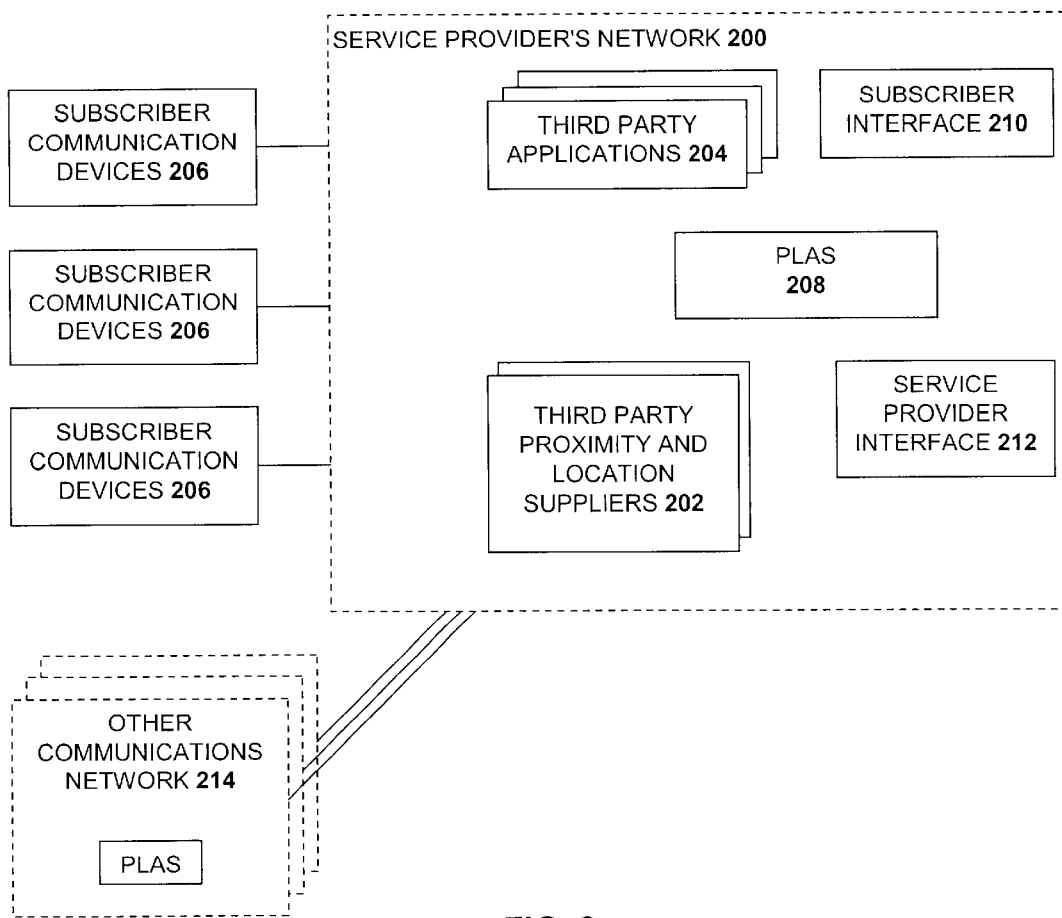
FIG. 2 is a schematic representation of a network in which a PLAS is incorporated.

FIG. 2 schematically illustrates an overlay of a PLA system on a service provider's communication network 200. The communication network 200 may be any network for transmitting telephonic or data signals. The network 200 includes a variety of subscriber communication devices 206 which may include, by way of example, conventional telephones, cellular phones, wireless application protocol ("WAP") phones, personal computers and personal management ("PDA") devices.

As illustrated in FIG. 2, the PLA system is created around a presence, location and availability server ("PLAS") 208. The PLA system includes a subscriber interface 210, including a graphical user interface ("GUI"), which may be remotely accessed by subscribers through personal computers or the like. A service provider interface 212 is also provided in communication with the PLAS 208 by means of a GUI or the like for allowing service provider control of the PLAS 208. The PLA system further includes any number of third party applications 204 which utilize proximity, location and availability information about a subscriber associated with the network 200. The PLAS 208 includes interfaces with these third party applications 204. Finally, the PLA system includes third party proximity and, preferably, location suppliers 202, in communication with the PLAS 208 through included interfaces. As indicated, other communication networks 214 may interface with the network 200 and each such other communication network 214 may include a PLA system similar to the PLA system described above. By virtue of such a multi-network interface, proximity, location and availability information about subscribers in the different communication networks 200, 214 can be shared.

In operation, the PLAS 208 keeps track subscribers' presence and availability in the network (including, optionally, their geographic location) and processes third party requests for information.

Figure 3:
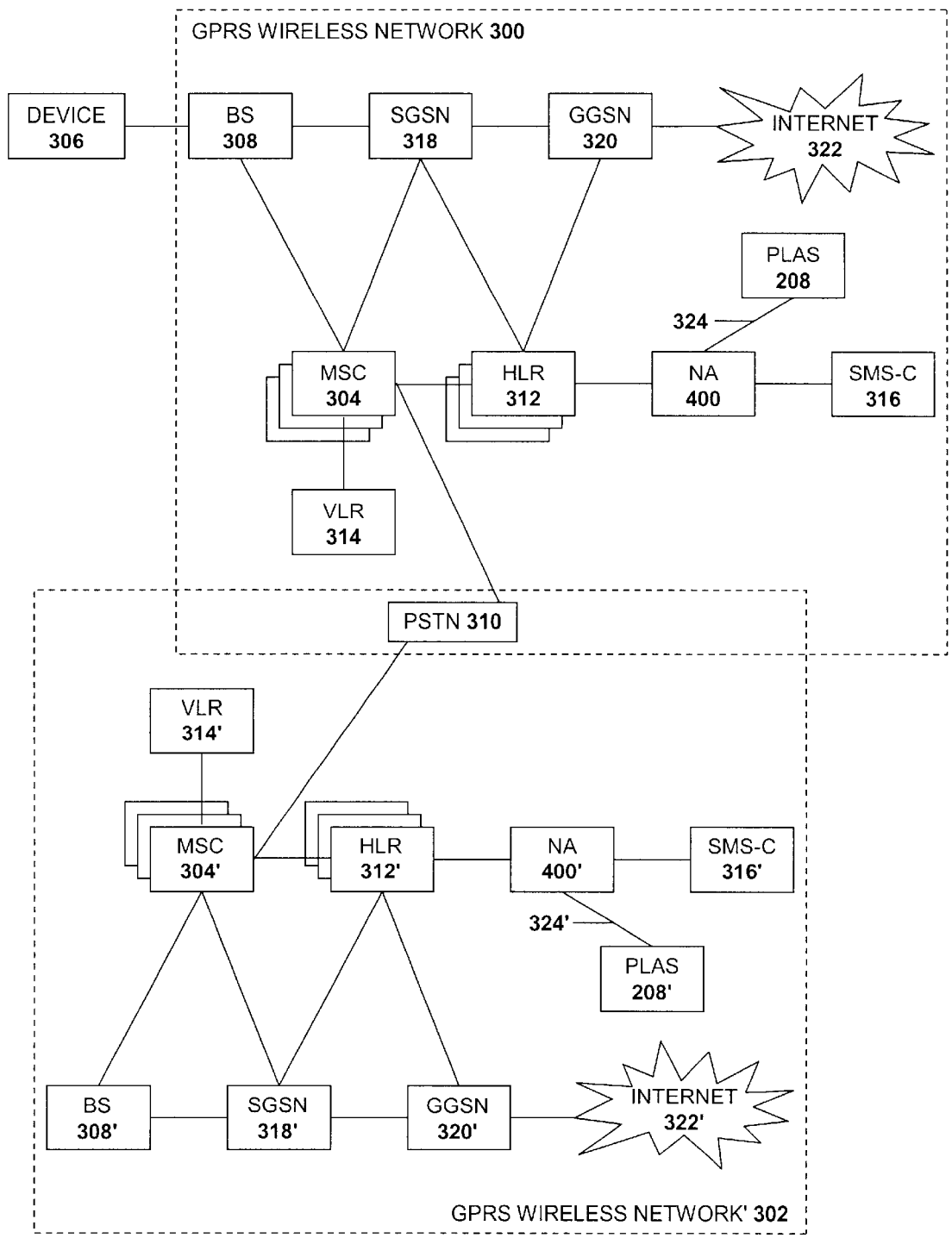
FIG. 3 is a schematic representation of two wireless networks including a network adapter of the present invention.

FIG. 3 is simplified schematic representation of a first general packet radio service ("GPRS") wireless network 300 and a second GPRS wireless network 302. Because these wireless networks are comparable in configuration, only the first network 300 will be described and like reference numbers will be used for both the first and second GPRS wireless networks 300 and 302, with a prime symbol (" ' ") indicating elements of the second GPRS wireless network 302.

The first wireless network 300 consists of a mobile switching center ("MSC") 304 which controls the flow of voice and data between a wireless communication device 306, a base station ("BS") 308 and a public switch telephone network ("PSTN") 310. Also included in the network 300 are one or more home location registers (HLRs) 312 linked to the MSC 304, each of which stores information regarding the mobile communication devices 306 associated with the system. Such information may include, but is not limited to, device identifiers, subscriber's associated with the device and the capabilities of the device 306 (i.e. the ability of the device 306 to receive one or more of voice and text messages). Also linked to the MSC 304 is a visitor location register ("VLR") 314 which tracks information about communication devices 306 present on the network but which are not devices of subscribers to the network. The VLR 314 tracks information similar to that stored on the HLR 312 for the visiting devices. A short message service center ("SMS-C") 316 is also linked to the HLR 312. The SMS-C 316 enables the network to convey short messages (such as less than about 160 characters) across the network.

For the purpose of conveying data, the GPRS wireless network 300 also includes a serving GPRS support node ("SGSN") 318 which is linked to the base station 308, the MSC 304, the HLR 312 and a gateway GPRS support node ("GGSN") 320. The GGSN 320 in turn is linked to the HLR 312 and the internet 322.

In the normal course of operation, when a wireless device 306 registers with the network, device specific identifying headers will be included in a message transmitted from the device 306 through the base station 308, the MSC 304, the HLR 312 and the SMS-C 316. The present invention comprises the network adapter 400 which resides on the link between the HLR 312 and the SMS-C 316. The network adapter 400 is configured to intercept SS7 messages between the HLR 312 and the SMS-C 316 indicating the presence of a device 306 on the network 300. The network adapter 400 then conveys this presence information to a PLAS 208. As described in greater detail in the above referenced co-pending application, the PLAS 208 has one or more applications associated with it which process the PLA information from the network adapter 400 to provide useful services to PLA subscribers.

Figure 4:
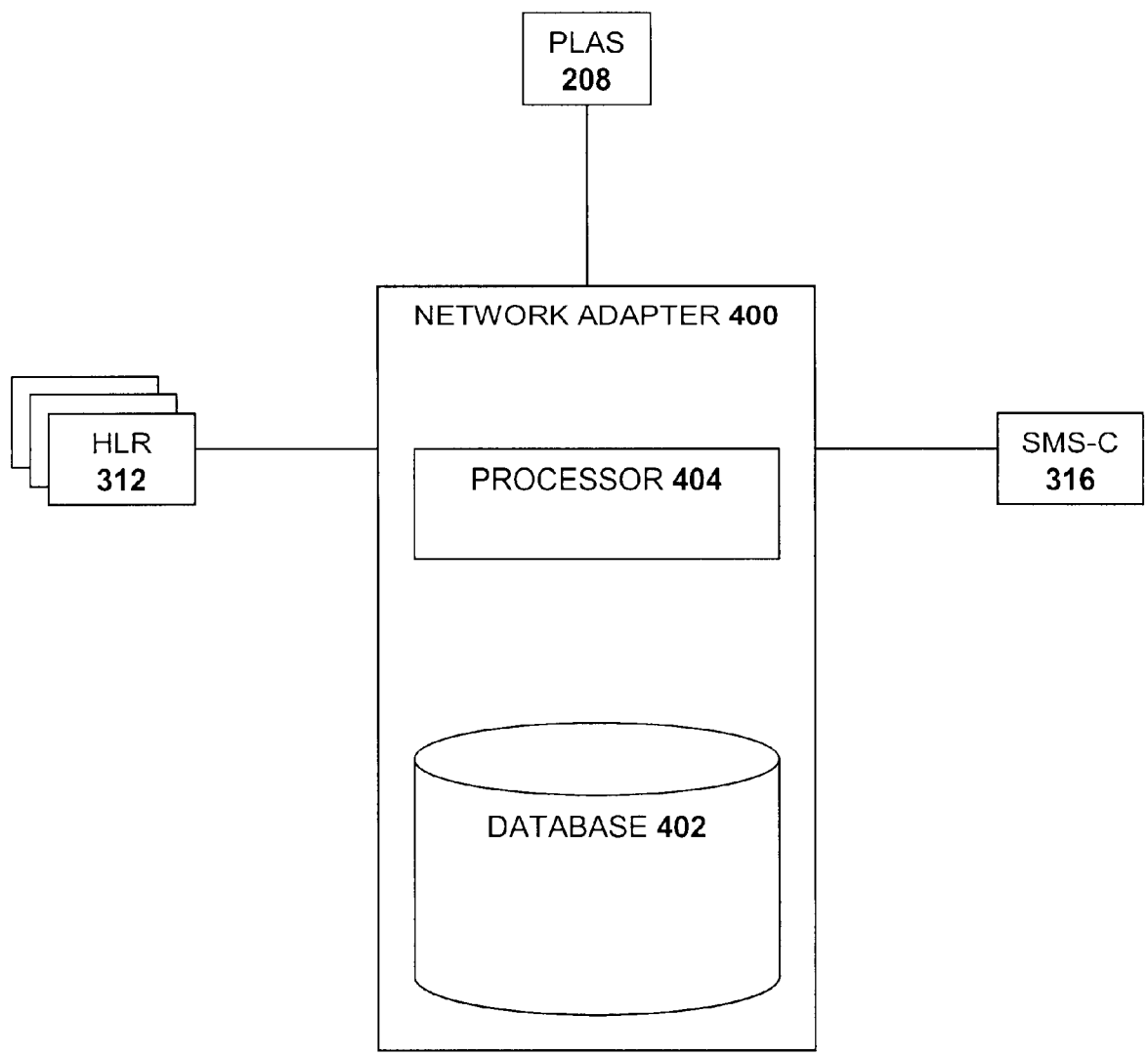
FIG. 4 is a schematic representation of a network adapter in accordance with the invention.

The network adapter 400 is illustrated schematically in FIG. 4 and includes a database 402 for storing information including the identities of subscribers to PLA services and the identifiers of their devices useable with the PLA services. The network adapter 400 also includes a processor 404 for processing intercepted SS7 messages between the HLR 312 and the SMS-C 316 and for extracting presence information regarding device identifiers stored in the database 402.

The manner in which the network adapter 400 intercepts and processes the SS7 messages may vary. Preferably, by means of translators or other similar masking devices, the network adapter 400 will appear through one interface to the HLR 312 as the SMS-C 316 and will appear through another interface to the SMS-C 316 as the HLR 312, thereby facilitating interception of messages. However, the network adapter 400 should not materially interfere with the flow of data between the HLR 312 and the SMS-C 316. To that end, the HLR 312 may include a delay buffer which receives SS7 communication between the HLR 312 and the SMS-C 316 and which gives the processor 404 sufficient time to analyze the message for relevant PLA information before passing the message on to the SMS-C 316 and then passing a copy of the PLA information to the PLAS 208. In an alternative embodiment, the processor 404 may include a routine which examines intercepted messages for any identifiers stored in the database 402. If the relevant identifiers are not present in a message, the message is simply passed on to the target unit, the HLR 312 or the SMS-C 316, as the case may be. If a relevant identifier is present, the message is copied and forwarded to the target unit. The copied message is also processed by the processor 404 with the relevant PLA information being forwarded to the PLAS 208. Both of these described options are intended to reduce the impact of the network adapter 400 on the network efficiency. Alternatively, or complementing either of the two processing methods disclosed above, the network adapter 400 may receive a request from the PLAS 208 to determine the presence of a specific device on the network. The network adapter 400 forwards the inquiry to the HLR 312 and onto the network 300. When a response is received back from the network 300 through the HLR 312, the network adapter 400 sends a notice to the PLAS 208 indicating the status of the requested device. Other efficient options for monitoring and providing PLA information to an application may be suitable as well.

In the current state of the art, the location information which the network adapter 400 may extract from intercepted messages has a relatively low resolution and the information is only able to identify a particular MSC 304 with which a device 306 is associated. However, when used in the future in conjunction with developing E-911 infrastructure, which employs triangulation, more precise location information may be provided to the PLAS 208.

In the forgoing embodiment, it should be noted that only one SMS-C 316 is included on the network 300, whereas there are multiple HLRs 312. By inserting the network adapter 400 on a link between the HLRs 312 and the SMS-C 316, the network adapter 400 can intercept PLA information regarding all communication devices 306 present on the network 300 from a single location. Also, because the network adapter 400 is "downstream" from the HLRs 312, it intercepts public protocols as opposed to any proprietary protocols which may be used upstream of the HLR 312 and which differ among networks. The network adapter 400 is intended for use in intercepting versions of SS7 signaling protocols, whether conforming to the IS-41 SS7 or the GSM MAP SS7 standard.

Preferably, the network adapter 400 employs a Sun Solaris operating system compatible with the PLAS 208 to allow for co-residency of the network adapter 400 with the PLAS 208, if desired.

The following are exemplary usage scenarios which illustrate the operation of the network adapter 400. These usage scenarios are not intended to be exhaustive but merely describe the basic operation of the network adapter 400 in several situations.

1. Presence request with communication device present.
   a. The PLAS 208 requests that the presence of a specific device be discovered by the network adapter 400 by means of a query to the network adapter 400 through a Java RMI interface 324.
   b. The network adapter 400 sends a short message service request (SMSREQ) to the HLR 312 serving the device of interest; the SMSREQ contains the identifying number ("MIN") of the device which the PLAS 208 is attempting to find.
   c. The HLR 312 sends an SMSREQ to the VLR 314 containing the MIN and other necessary identifiers of the sought device.
   d. The VLR 314 sends a SMSREQ to the MSC 304 for the device.
   e. Because of the availability of the device, the MSC 304 responds with a SMSREQ containing the SMS routing address.
   f. The VLR 314 forwards the SMSREQ to the HLR 312.
   g. The HLR 312 forwards the SMSREQ to the network adapter 400.
   h. And the network adapter 400 sends an indication of the device's presence to the PLAS 208 through the RMI interface 324.
2. Presence request with the device not present.
   a. The PLAS 208 requests that the presence of a specified device be discovered by the network adapter 400 using the RMI interface 324.
   b. The network adapter 400 sends a SMSREQ to the HLR 312 serving the device containing the identifying number ("MIN") of the device.
   c. The HLR 312 sends a SMSREQ to the VLR 314 containing the MIN and other identifying information of the sought after device.
   d. The VLR 314 sends a SMSREQ to the MSC 304 for the device.
   e. Because of the unavailability of the device, the MSC 304 responds with a SMSREQ with an "access denied" parameter and a reason code of "unavailable".
   f. The VLR 314 forwards the SMSREQ to the HLR 312.
   g. The HLR 312 forwards the SMSREQ to the network adapter 400.
   h. The network adapter 400 sends a "presence not detected" signal to the PLAS 208 using the RMI interface 324.
3. SMS delivery with network adapter on the network.
   a. The SMS-C 316 sends a SMSREQ containing the identifying information ("MIN") of the specified communication device to the HLR 312. The message is intercepted by the network adapter 400.
   b. The network adapter 400 forwards the SMSREQ to the HLR 312 serving the requested device.
   c. The HLR 312 sends a SMSREQ to the VLR 314 containing the MIN and other identifying information of the device being sought.
   d. The VLR 314 sends an SMSREQ to the MSC 304 for the device.
   e. The SMS-C 316 responds with an SMSREQ containing the SMS routing address for the device.
   f. The VLR 314 forwards the SMSREQ to the HLR 312.
   g. The HLR 312 forwards the SMSREQ to the SMS-C 316, but the SMSREQ is intercepted by the network adapter 400.
   h. The network adapter 400 sends an indication of the device presence to the PLAS 208 using the RMI interface 314.
   i. The network adapter 400 also forwards the SMSREQ to the SMS-C 316.
4. Presence request with response based on intercepted information:
   a. On an on-going basis, the network adapter 400 intercepts messages between the HLR 312 and the SMS-C 316.
   b. The network adapter processor 404 extracts device identification from the messages.
   c. The processor 404 compares such identifiers with identifiers recorded in the network adapter database 402 representing registered subscriber devices.
   d. If a match is obtained, the processor 404 extracts location information and updates the appropriate record stored in the database 402.
   e. The PLAS 408 requests that the presence of a specific registered device be discovered by the network adapter 400.
   f. The network adapter processor 404 queries the database 402 and retrieves the record for the requested device.
   g. If the record indicates that the requested device is still present on the network, the network adapter 400 sends an indication of the device presence to the PLAS 208.
   h. Otherwise, the network adapter 400 sends an indication of the device absence to the PLAS 208.
   i. If the record retrieved by the processor 404 from the database 402 is determined to be obsolete, the network adapter 400 attempts to locate the device in the manner outlined in 1. and 2. above.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A network adapter for a communications network having subscriber devices, a presence, location and availability system (PLAS), at least one home location register (HLR) and a short message service center (SMS-C), the network adapter comprising:
   a first interface interconnecting with the at least one HLR;
   a second interface interconnecting with the SMS-C;
   a third interface interconnecting with the PLAS;
   a first translator interconnected with said first interface to permit the network adapter to appear to the at least one HLR as the SMS-C;
   a second translator interconnected with said second interface to permit the network adapter to appear to the SMS-C as the at least one HLR,
   whereby the network adapter intercepts messages from the at least one HLR and forwards such messages to the SMS-C and whereby the network adapter intercepts messages from the SMS-C and forwards such messages to the at least one HLR; and
   a processor for extracting predetermined information about subscriber devices from such intercepted messages and transmitting the predetermined information to the PLAS through said third interface.

2. The network adapter of claim 1, further comprising a database for storing the predetermined information in a record.

3. The network adapter of claim 2, wherein the predetermined information includes location information, said processor comprising:
   means for receiving from the PLAS, through said third interface, a request for location information about a designated subscriber device;
   means for accessing said database;
   means for determining whether a record for the designated subscriber device is present in said database; and
   means for transmitting to the PLAS, through said third interface, location information about the designated subscriber device if a record for the designated subscriber device is present in said database.

4. The network adapter of claim 1, wherein said processor further comprises:
   means for receiving from the PLAS, through said third interface, a first request for location information about a designated subscriber device;
   means for transmitting to the at least one HLR, through said first interface, a second request for location information about the designated subscriber device;
   means for receiving from the at least one HLR, through said first interface, a first response containing location information about the designated subscriber device; and
   means for transmitting to the PLAS, through said third interface, a second response containing location information about the designated subscriber device.

5. A network adapter for a communications network having a presence, location and availability system (PLAS), at least one home location register (HLR) and a short message service center (SMS-C), the network adapter comprising:
   a database;
   means for appearing to the at least one HLR as the SMS-C and for intercepting first messages transmitted from the at least one HLR to the SMS-C;
   means for extracting predetermined information about subscriber devices from the first intercepted messages;
   means for forwarding the first intercepted messages to the SMS-C;
   means for storing the predetermined information in a database record;
   means for accessing said database in response to a request from the PLAS for location information about a designated subscriber device;
   means for determining whether a record for the designated subscriber device is present in said database; and
   means for transmitting to the PLAS location information about the designated subscriber device if a record for the designated subscriber device is present in said database.

6. The network adapter of claim 5, further comprising:
   means for appearing to the SMS-C as the at least one HLR and for intercepting second messages transmitted from the SMS-C to the at least one HLR; and
   means for forwarding the second intercepted messages to the at least one HLR.

7. A method for operating a communications network having a presence, location and availability system (PLAS), at least one home location register (HLR) and a short message service center (SMS-C), the method comprising:
   appearing to the at least one HLR as the SMS-C and for intercepting first messages transmitted from the at least one HLR to the SMS-C;
   extracting predetermined information about subscriber devices from the first intercepted messages;
   forwarding the first intercepted messages to the SMS-C;
   storing the predetermined information in a database record;
   accessing the database in response to a request from the PLAS for location information about a designated subscriber device;
   determining whether a record for the designated subscriber device is present in said database; and
   transmitting to the PLAS location information about the designated subscriber device if a record for the designated subscriber device is present in the database.

8. The method of claim 7, further comprising:
   appearing to the SMS-C as the at least one HLR and for intercepting second messages transmitted from the SMS-C to the at least one HLR; and
   forwarding the second intercepted messages to the at least one HLR.

* * * * *